(12) United States Patent
Bartling

(10) Patent No.: US 7,128,284 B2
(45) Date of Patent: Oct. 31, 2006

(54) SPRINKLING APPLIANCE

(75) Inventor: Werner Bartling, Elze (DE)

(73) Assignees: Norbert Goldmann, Springe (DE); Luise Bartling, Elze (DE)

(*) Notice: Subject to any disclaimer, the term of this patent is extended or adjusted under 35 U.S.C. 154(b) by 157 days.

(21) Appl. No.: 10/220,898

(22) PCT Filed: Mar. 16, 2001

(86) PCT No.: PCT/IB01/00671

§ 371 (c)(1),
(2), (4) Date: Mar. 19, 2004

(87) PCT Pub. No.: WO01/68431

PCT Pub. Date: Sep. 20, 2001

(65) Prior Publication Data

US 2004/0195370 A1 Oct. 7, 2004

(30) Foreign Application Priority Data

Mar. 17, 2000 (AT) .............................. A 442/2000

(51) Int. Cl.
A01C 15/00 (2006.01)
A01C 15/02 (2006.01)
A01C 15/04 (2006.01)

(52) U.S. Cl. ...................... 239/650; 239/651; 239/652; 239/654; 239/656; 239/658

(58) Field of Classification Search ................ 239/650, 239/652, 651, 654, 656, 658, 659, 668, 669, 239/681
See application file for complete search history.

(56) References Cited

U.S. PATENT DOCUMENTS

| 3,568,937 | A | * | 3/1971 | Grataloup | ................... 239/655 |
| 3,662,922 | A | * | 5/1972 | Gesior | ......................... 222/46 |
| 3,949,908 | A | * | 4/1976 | Baillie | ......................... 406/181 |
| 4,145,894 | A | * | 3/1979 | Frank et al. | ................... 62/344 |
| 4,930,685 | A | * | 6/1990 | Landers | ...................... 222/370 |
| 5,725,160 | A | * | 3/1998 | Harper et al. | ............... 239/654 |
| 5,795,108 | A | * | 8/1998 | Lightle | ........................ 406/48 |

FOREIGN PATENT DOCUMENTS

| DE | 21 11 843 | 9/1972 |
| EP | 0 149 417 | 7/1986 |
| EP | 0 378 068 | 7/1990 |
| WO | WO 90 06591 | 2/1990 |

* cited by examiner

Primary Examiner—Davis Hwu
(74) Attorney, Agent, or Firm—Martin Fleit; Paul D. Bianco; Fleit Kain Gibbons Gutman Bongini & Bianco P.L.

(57) ABSTRACT

A sprinkling appliance (1) comprising a reservoir (2), a metering means (3) and a preferably compressed-air actuated conveying and dispensing (5), respectively, for dispensing the sprinkling material, wherein the metering means (3) for metering sprinkling material has at least one conveyer or closure surface (19), respectively, capable of being rotated about an axis of rotation (4').

20 Claims, 2 Drawing Sheets

SPRINKLING APPLIANCE

BACKGROUND OF THE INVENTION

1. Field of the Invention

The invention relates to a sprinkling appliance.

2. Prior Art

Such sprinkling appliances are intended for sprinkling or spraying sprinkling material, in particular dry sand or other anti-skid materials, in front of the wheels of vehicles, such as, e.g., rail-borne vehicles or motor trucks.

From AT 403 599 A, a sprinkling appliance is known which comprises metering by means of an axially displaceable piston, which metering is separate from the conveyance of the sand. After metering, the material to be sprinkler is fed into a conveying and dispersing device designed as an injector and actuated by compressed air so as to be dispensed therefrom. This has the advantage that a substantially smaller amount of sprinkling material is consumed than in sprinkling appliances in which metering of the material to be sprinkled is not effected separately from its conveyance, This sprinkling appliance does, however, have the disadvantage that the metered amount of material to be sprinkled, e.g. sand, will depend on the quality of the sand or on the grain size of the sand, since the opening gap of the metering piston is not changeable, This harbors the risk that the opening gap will be too small for coarse-grained sand, and thus the opening of the metering piston will be clogged by sand grains not passing therethrough, resulting in an undesired interruption of the sand discharge.

DE 30 42 413 A1 shows a sprinkling appliance for grained material comprising a motor-driven rotor hurling the sprinkling material into a discharge opening. Yet the rotor is not designed as a metering means, much rather an undosed spraying of the sprinkling material is achieved by a brush roll.

SUMMARY OF THE INVENTION

The invention now has as its object to counteract this negative effect and to provide a sprinkling appliance in which metering of the sprinkling material is independent of the respective quality or grain size of the sprinkling material present, whereby the risk of clogging of the metering device is reduced. Furthermore, metering is to be infinitely variably adjustable. In a sprinkling appliance according to the invention and of the initially defined type, this object is achieved by the measures according to the characterizing part of claim 1.

Usually, cellular wheel sluices are locking devices serving to separate pneumatic conveying systems from mechanical conveying means, By means of the defined chamber volume of a cellular wheel and of a regulatable, freely selectable number of revolutions of this wheel, a certain metering amount can be adjusted.

Thus, the parameter determining the amount of metered sprinkling material is the number of revolutions of the rotatable conveying and closing surface, In the at-rest position, the conveyer and closure surface, respectively, thus locks the connection between the reservoir and the compressed-air actuated conveying and dispensing means, whereas it receives an appropriately metered amount of sprinkling material during rotation, in dependence on the revolving speed, and conveys it to the conveying and dispensing means.

If the vanes sub-dividing the cellular wheel into several chambers and serving as conveyer and closure surface, respectively, are made of a flexible material, the vanes can yield in case sprinkling material is caught between the vanes and the surrounding housing, whereby advantageously a damage or an excessive wear of the cellular wheel vanes is avoided.

To obtain a flexible conveyer and closure surface, respectively, it is advantageous if the vanes sub-dividing the cellular wheel into several chambers consist of brushes.

For a simple and inexpensive production of the cellular wheel and suitable material properties, particularly in terms of flexibility, it is advantageous if the cellular wheel, or the cells, respectively, is (are) made of a synthetic material or of rubber.

For a long useful life of the cellular wheel, with the desired flexibility nevertheless being provided, it is advantageous if the cellular wheel is made of metal, preferably sheet metal.

It is, however, also possible to produce the cellular wheel of another material, e.g. a synthetic material, rubber or the like.

To achieve an optimum metering in dependence on the different qualities of sprinkling material prevailing, it is suitable if the cellular wheel is exchange able.

If the volume of the chambers of the cellular wheels is changeable, an advantageous further possibility is provided to adjust the metering of the sprinkling material, in addition to regulating the number of revolutions.

To enable as precise a metering as possible of the sprinkling material to be dispensed, it is advantageous if the number of revolutions of the rotatable metering means is infinitely variably adjustable.

If a drive unit is provided to control the number of revolutions of the at least one conveyer and closure surface, respectively, the number of revolutions advantageously can be adjusted independently of the remaining parameters in the sprinkling appliance.

For a drive of simple construction with a precise regulation of the number of revolutions, it is suitable if a d.c. motor comprising an electronic rpm control is provided as drive unit. Instead of the d.c. motor, also a fluid power motor or a compressed-air motor or another motor may be used. In a fluid power motor, the rpm regulation could also be achieved via a fluid amount control, or in a compressed-air motor via a compressed-air valve.

For a suitable number of revolution-transmission between drive unit and metering means, it is advantageous if a reducing gear is provided between drive unit and metering means.

If a nonreturn valve is provided between the compressed-air actuated conveying and dispensing device and a compressor provided for the compressed-air supply, a return flow of air into the compressor can advantageously be prevented.

The nonreturn valve mainly serves to protect the compressor, in particular in case of so-called two-directional vehicles in which, due to the possible change of the direction of movement, sprinkling appliances are provided on both sides of the wheels, since an impact pressure will result in the conveying duct in those sprinkling appliances which are not actuated during movement of the vehicle, which impact pressure may change into a dynamic pressure in the system, thus resulting in an undesired flow of air directed contrary to the conveying direction proper, which flow of air in turn can cause moisture and sand to get into the compressor. This, in turn, may cause the formation of lumps and finally, a blocking of the sprinkling appliance.

In the following; the invention will be explained in more detail by way of preferred exemplary embodiments illustrated in the drawings to which, however, it shall not be restricted.

DETAILED DESCRIPTION OF PREFERRED EMBODIMENTS

Figure 1:
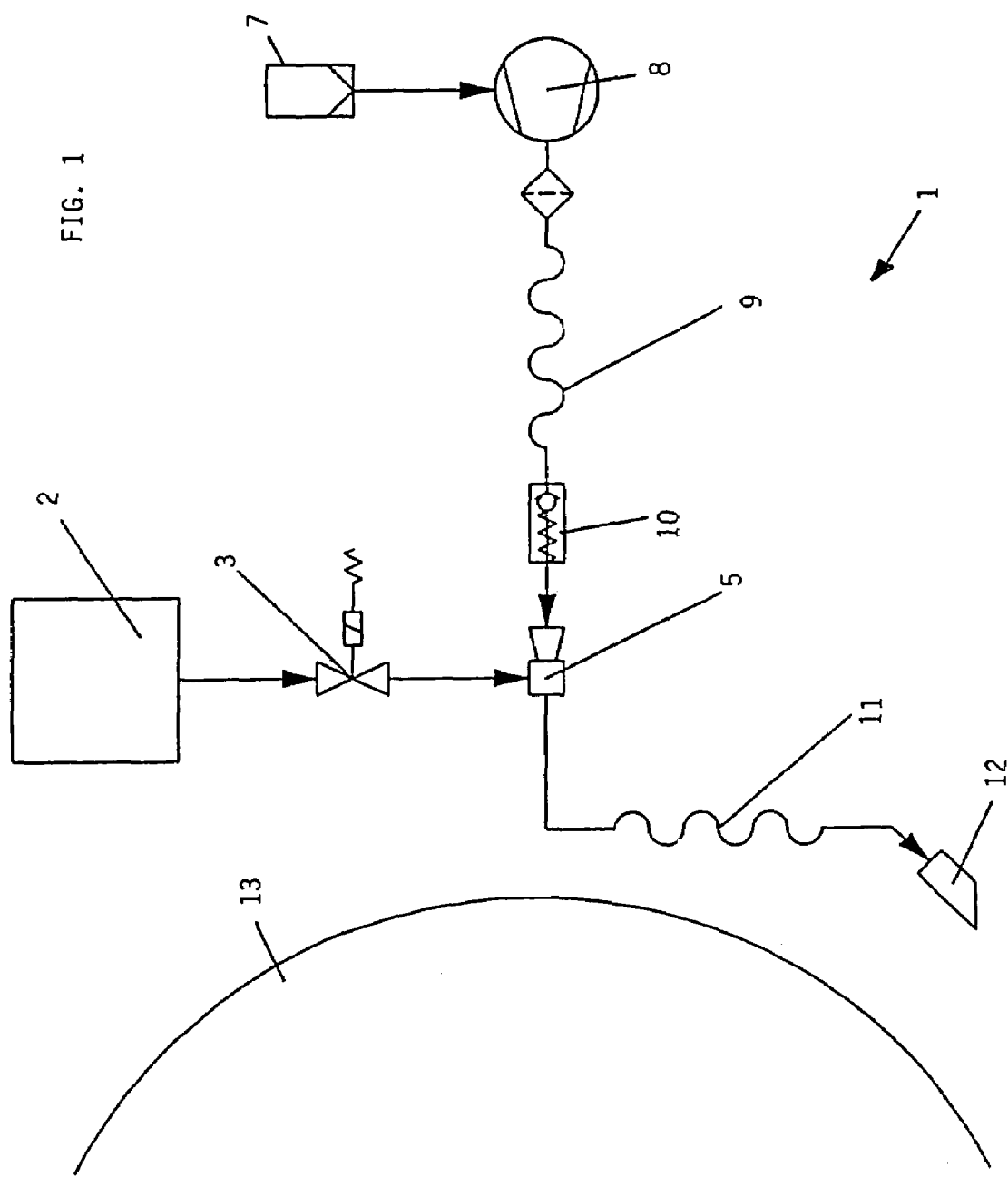
FIG. 1 shows a schematic block diagram illustration of the sprinkling appliance.

FIG. 1 schematically shows a block diagram of a sprinkling appliance 1 comprising a reservoir 2 connected to a metering means 3. in the exemplary embodiment illustrated in FIG. 1, a cellular wheel sluice is provided as the metering means 3. By means of the cellular wheel sluice 3 it is possible for the metered amount to became independent of the quality, or grain size, respectively, of the sand provided in the reservoir 2.

The cellular wheel 4 rotatable in the cellular wheel sluice 3 (cf. FIG. 2) serves as a closing organ, on the one hand, so as to interrupt the flow of sand between reservoir 2 and injector 5, and as a conveying means, on the other hand, so as to convey the sand to be dispensed into the conveying and dispensing means actuated by compressed air and designed as the injector 5.

The sand material introduced into the injector 5 via the cellular wheel sluice 3 is conveyed under compressed-air actuation via a sand hose duct 11 to the sprinkling tube 12, from which it emerges as anti-skid material for a wheel 13. The compressed-air actuation is effected by means of a compressor 8 which is fed by a pressure tank 7 and is connected with the injector 5 via a compressed-air hose 9.

What is essential is that the amount of sand introduced from the cellular wheel sluice 3 into the injector 5 will only depend on the number of revolutions of the cellular wheel 4 and on the chamber volume of the cellular wheel 4, and thus a substantially improved control of metering of the amount of sand to be dispensed will be achieved, as compared to the known sprinkling appliances.

Nonreturn valve 10 serves to protect the compressor 8, since in so-called two-directional vehicles such sprinkling appliances, viewed in the direction of driving, are applied on both sides of the wheels 13. This will result in impact pressures in the region of the conveying duct 11 in the sprinkling appliances applied in the opposite direction to the actual direction of driving, which impact pressures are capable of changing into dynamic pressures within the system, and thus would cause an undesired return conveyance of air in the direction of compressor 8. The air flowing back would transport moisture and dust, or sand particles, respectively, into the system, which would result in a blocking of the sprinkling appliance 1.

Figure 2:
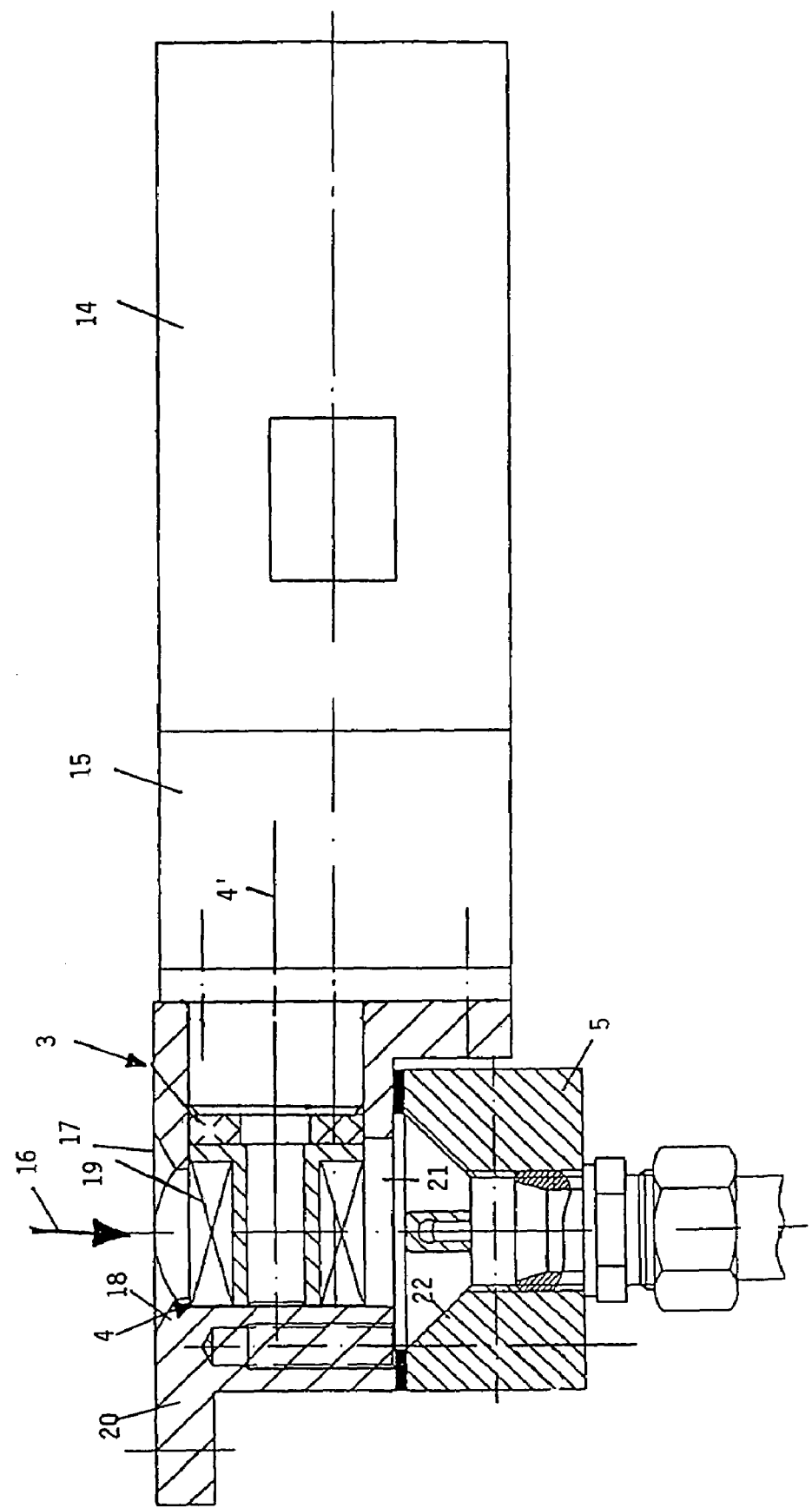
FIG. 2 in detail shows a cellular wheel sluice as the metering device shown in FIG. 2 with a driving unit.

FIG. 2 in detail shows a partially broken away view of the cellular wheel sluice 3 with a d.c. motor 14 as driving unit for the rotation of the cellular wheel 4 about the axis of rotation 4'. For a suitable transmission of the torque between the d.c. motor 14 and the cellular wheel 4, a reducing gear 15 is interposed. Sand enters the cellular wheel sluice 3 in the direction of arrow 16 from the reservoir 2 via the entry opening 17. To attain a reliable introduction also in case of a poor sand quality or coarse-grained sand, the entry opening 17 has a funnel-shaped end portion 18.

By means of the cell vanes 19, the cellular wheel 4 is divided into several star-shaped chambers which, in turn, are changeable so as to determine the metered amount of sand to be dispensed. The vanes 19 of the cellular wheel 4 which, preferably, are made of synthetic material or of sheet metal, are flexible so as to prevent a damage or a jamming of the cellular wheel 4 if sand or dust particles are caught between housing 20 and cellular wheel 4.

Discharge opening 21 of the cellular wheel sluice 3 is followed by the injector, also via a funnel-shaped opening 22.

To obtain an infinitely variable metering of the amount of sand via the cellular wheel 4 whose number of revolutions can be controlled, the d.c. motor 14 is provided with an electronic rpm control, in which the rpm control preferably is effected via a potentiometer. However, also other driving units, such as, e.g., a fluid power motor or a motor operated by compressed air, can be provided, control of the fluid power motor being obtained via the amount of fluid and in the compressed air motor via a compressed air controlled by a pressure valve.

The outer dimensions of the cellular wheel sluice 3 provided as the metering means correspond to those of hitherto common piston metering means. The sprinkling appliance 1 thus has outer dimensions which are in agreement with those of sprinkling appliances hitherto used. This makes it possible to instal a sprinkling appliance 1 according to the invention in the place of a conventional sprinkling appliance, and thus to achieve an improvement in the metering of sand by a simple exchange.

In particular, in this manner an independence of the grain size of the sand to be sprinkled is achieved, which is of particular importance since sands of highly differing qualities are used in which the sand diameter will range from less than 0.5 mm to very coarse sand diameters of more than 8 mm.

Thus, the amount of sand consumed can be lowered, since in conventional sprinkling appliances a relatively large minimum width of the piston gap is provided for a guaranteed passage in case of coarse grained sands, and thus a relatively large minimum amount of sand must be metered and dispensed.

It is, of course, possible to provide for various changes in terms of construction within the scope of the invention. Thus, it is possible to choose a conveying and dispensing means operating on the basis of gravity instead of the compressed-air-actuated conveying and dispensing means. A gravity-operated device, e.g. a gravity-feed sand sprinkler, may serve as such a device.

The invention claim is:

1. A sprinkling appliance comprising:
   a reservoir,
   a metering means including a cellular wheel having vanes delimiting several chambers, wherein the vanes are made of a flexible material and are rotatable about an axis of rotation and project radially thereto,
   a compressed-air actuated conveying and dispensing means for dispensing the sprinkling material, and
   a non-return valve provided between the compressed-air operated conveying and dispensing means and a compressor provided for the compressed air supply.

2. A sprinkling appliance according to claim 1, characterized in that the vanes sub-dividing the cellular wheel into several chambers consist of brushes.

3. A sprinkling appliance according to claim 1, characterized in that one of the cellular wheel and the cells, respectively, is made of one of a synthetic material and rubber.

4. A sprinkling appliance according to claim 1, characterized in that the cellular wheel is made of metal.

5. A sprinkling appliance according to claim 1, characterized in that the cellular wheel is exchangeable.

6. A sprinkling appliance according to claim 1, characterized in that the volume of the cellular wheel chambers is changeable.

7. A sprinkling appliance according to claim 1, wherein the metering means includes at least one conveyer and closure surface, characterized in that the number of revolutions of the at least one conveyer and closure surface, respectively, is infinitely variable.

8. A sprinkling appliance according to claim 1, characterized in that a drive unit is provided for controlling the number of revolutions of the metering means.

9. A sprinkling appliance according to claim 8, characterized in that a d.c. motor having an electronic number of revolutions-control is provided as drive unit.

10. A sprinkling appliance according to claim 1, characterized in that the cellular wheel metering means is designed as a gravity-operated device.

11. A sprinkling appliance comprising:
a reservoir,
a metering means including a cellular wheel having vanes delimiting several chambers, wherein the vanes are made of a flexible material and are rotatable about an axis of rotation and project radially thereto,
a compressed-air actuated conveying and dispensing means for dispensing the sprinkling material, and
a drive unit for controlling the number of revolutions of the metering means,
wherein a reducing gear is provided between the drive unit and the metering means.

12. A sprinkling appliance according to claim 11, characterized in that the vanes sub-dividing the cellular wheel into several chambers consist of brushes.

13. A sprinkling appliance according to claim 11, characterized in that one of the cellular wheel and the cells, respectively, is made of one of a synthetic material and rubber.

14. A sprinkling appliance according to claim 11, characterized in that the cellular wheel is made of metal.

15. A sprinkling appliance according to claim 11, characterized in that the cellular wheel is exchangeable.

16. A sprinkling appliance according to claim 11, characterized in that the volume of the cellular wheel chambers is changeable.

17. A sprinkling appliance according to claim 11, wherein the metering means includes at least one conveyer and closure surface, characterized in that the number of revolutions of the at least one conveyer and closure surface, respectively, is infinitely variable.

18. A sprinkling appliance according to claim 11, characterized in that a d.c. motor having an electronic number of revolutions-control is provided as the drive unit.

19. A sprinkling appliance according to claim 11, characterized in that a non-return valve is provided between the compressed-air operated conveying and dispensing means and a compressor provided for the compressed air supply.

20. A sprinkling appliance for sprinkling anti-skid material in front of a wheel of a vehicle, the appliance comprising:
a reservoir containing the anti-skid material;
a metering means including a cellular wheel having vanes delimiting several chambers, wherein the vanes are made of a flexible material and are rotatable about an axis of rotation and project radially thereto, the flexible material selected to yield when anti-skid material is trapped between one of the vanes and a surrounding housing; and
a compressed-air actuated conveying and dispensing means for dispensing the anti-skid material, the conveying and dispensing means configured and arranged to dispense the anti-skid material in front of the wheel of the vehicle.

* * * * *